US011172368B2

(12) United States Patent
Katabathuni et al.

(10) Patent No.: US 11,172,368 B2
(45) Date of Patent: Nov. 9, 2021

(54) LOCATION-AWARE SPATIAL REUSE

(71) Applicant: Cisco Technology, Inc., San Jose, CA (US)

(72) Inventors: Sanjay Katabathuni, Fremont, CA (US); Benjamin Jacob Cizdziel, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 63 days.

(21) Appl. No.: 16/685,771

(22) Filed: Nov. 15, 2019

(65) Prior Publication Data
US 2021/0153026 A1 May 20, 2021

(51) Int. Cl.
*H04L 5/00* (2006.01)
*H04W 16/06* (2009.01)
*H04L 1/00* (2006.01)
*H04W 16/18* (2009.01)
*H04W 48/20* (2009.01)
*H04W 64/00* (2009.01)
*H04W 72/08* (2009.01)
*H04W 84/12* (2009.01)

(52) U.S. Cl.
CPC ......... *H04W 16/06* (2013.01); *H04L 1/0003* (2013.01); *H04W 16/18* (2013.01); *H04W 48/20* (2013.01); *H04W 64/003* (2013.01); *H04W 72/085* (2013.01); *H04W 84/12* (2013.01)

(58) Field of Classification Search
CPC ... H04L 5/0073; H04L 5/0044; H04L 5/0037; H04L 5/0094; H04L 5/0007; H04W 84/12; H04W 16/02; H04W 24/08; H04W 28/20; H04W 16/10; H04W 52/34; H04W 52/146; H04W 52/245; H04W 72/046; H04W 88/02; H04W 72/082; H04W 72/1215; H04W 88/06; H04W 24/02
See application file for complete search history.

(56) References Cited

U.S. PATENT DOCUMENTS

| 10,251,065 | B1* | 4/2019 | Jiang | H04W 52/262 |
| 2018/0139635 | A1* | 5/2018 | Oteri | H04W 52/34 |
| 2018/0270038 | A1* | 9/2018 | Oteri | H04L 5/0037 |
| 2019/0028898 | A1* | 1/2019 | Ko | H04W 16/02 |

OTHER PUBLICATIONS

Nadeem, Tamer; "Location-Aware IEEE 802.11 for Spatial Reuse Enhancement"; IEEE Transactions on Mobile Computing, vol. 6, No. 10; Oct. 2017 (16 pages).

(Continued)

*Primary Examiner* — Jung Liu
(74) *Attorney, Agent, or Firm* — Merchant & Gould P.C.

(57) ABSTRACT

Location-aware spatial reuse may be provided. First, an Overlapping Basic Service Set (OBSS) transmission to be received at a device may be detected by a first Access Point (AP). Then the location of the device may be determined. Next, based on the determined location, it may be determined that the device is out of range of the first AP. Then, in response to determining that the device is out of range of the first AP, the first AP may perform an OBSS Packet Detect (PD) based Spatial Reuse (SR) transmission without reducing a transmit (Tx) power for the transmission.

20 Claims, 4 Drawing Sheets

(56) References Cited

OTHER PUBLICATIONS

Notification of Transmittal of the International Search Report and The Written Opinion issued in International application No. PCT/US2020/060018, dated Feb. 19, 2021, (16 pages).

Anastasios Valkanis et al., IEEE 802.11ax Spatial Reuse Improvement: An Interference-Based Channel-Access Algorithm:, IEEE Vehicular Technology Magazine, IEEE, US, vol. 14, No. 2, Jun. 1, 2019 (7 pages).

Ropitault Tanguy "Evaluation of RTOT algorithm: a first implementation of OBSS PD-based SR method for IEEE 802.11ax" 2018 15th IEEE Annual Consumer Communications & Networking Conference (CCNC), IEE, Jan. 12, 2018; (7 pages).

Fengji Ye et al. "Distance-aware virtual carrier sensing for improved spatial reuse in wireless networks", Global Telecommunications Conference 2004. GLOBECOM-04 IEEE Allas, TX, USA Nov. 29-Dec. 3, 2004, Piscataway, NJ, USA vol. 6, Nov. 29, 2004. (5 pages).

* cited by examiner

LOCATION-AWARE SPATIAL REUSE

TECHNICAL FIELD

The present disclosure relates generally to wireless access points.

BACKGROUND

In computer networking, a wireless Access Point (AP) is a networking hardware device that allows a wireless compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where wireless access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
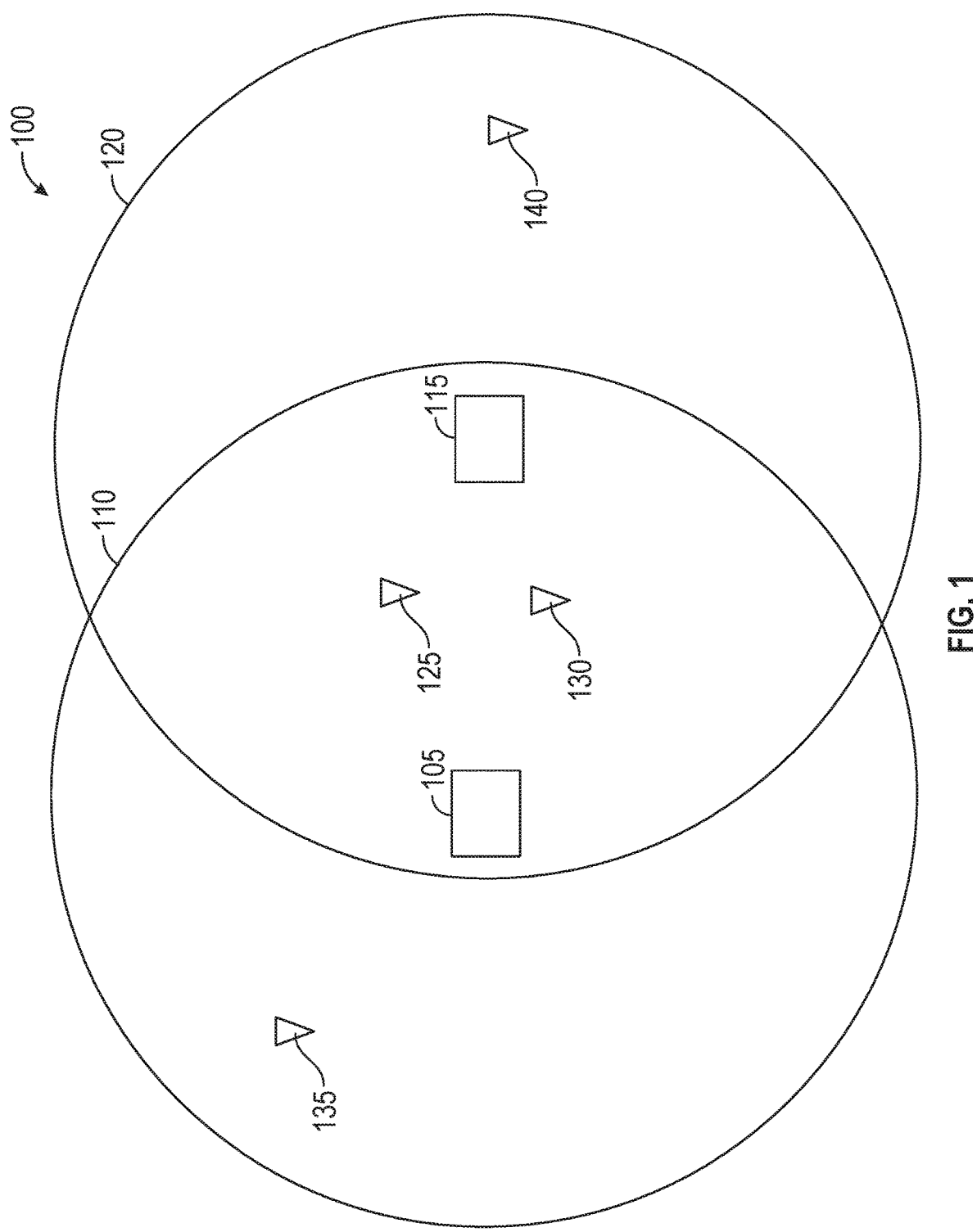
FIG. 1 is a block diagram of an operating environment.

Location-aware spatial reuse may be provided. First, an Overlapping Basic Service Set (OBSS) transmission to be received at a device may be detected by a first Access Point (AP). Then the location of the device may be determined. Next, based on the determined location, it may be determined that the device is out of range of the first AP. Then, in response to determining that the device is out of range of the first AP, the first AP may perform an OBSS Packet Detect (PD) based Spatial Reuse (SR) transmission without reducing a transmit (Tx) power for the transmission.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A set of features called Spatial Reuse (SR) may be defined by the Institute of Electrical and Electronics Engineers (IEEE) 802.11ax standard specification (e.g., Wi-Fi 6). SR may allow co-channel Overlapping Basic Service Sets (OBSSs) in a WLAN to transmit over each other in certain scenarios instead of backing off, potentially increasing network capacity. A process that may be supported by many Wi-Fi 6 devices is called OBSS Packet Detect (PD) based SR. This process may involve relaxing a packet detect threshold above which wireless devices may be required to defer their transmissions for received packets from other Basic Service Sets (BSSs) up to, for example, a maximum of −62 dBm (this value was, for example, −82 dBm). This may allow a device to transmit at the same time as an OBSS transmission with an Received Signal Strength Indicator (RSSI) received below the new threshold.

Adjacent APs in a WLAN may be assigned different channels to minimize OBSS interference. In some circumstances, however, there may not be a sufficient number of unique channels available, so some of the adjacent APs may be operating on the same channel. Embodiments of the disclosure may addresses a case where two or more adjacent APs are operating on the same primary channel or when two or more adjacent APs have overlapping channel-widths even though their respective primary channels are not the same.

Although OBSS PD based SR has the potential of increasing capacity, a downside to this process may be that OBSS PD based SR transmissions (i.e., transmissions over OBSS packets) may lead to significant interference upon a receiver of the OBSS transmission that may cause reception failures and reduced throughput for example. The Wi-Fi 6 standard may have a process for limiting the transmit (Tx) power based on the RSSI of the received OBSS packet. However, despite lowering the Tx power, the OBSS PD based SR transmission in some cases may reduce the Signal-to-Interference-Plus-Noise Ratio (SINR) that the receiver of the original OBSS transmission sees such that significant decoding error may be introduced. The OBSS PD based SR transmission may even be received by the OBSS receiver at a higher signal strength than the original OBSS transmission signal strength.

FIG. 1 shows an operating environment 100. As shown in FIG. 1, operating environment 100 may comprise a first AP 105, a first micro cell 110, a second AP 115, a second micro cell 120, and a plurality of client devices. The plurality of client devices may comprise a first client device 125, a second client device 130, a third client device 135, and a fourth client device 140. Each one of plurality of client devices may comprise, but is not limited to, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device.

First AP 105 may provide wireless network access for some of the plurality of client devices (e.g., first client device 125 and third client device 135). Micro cell 110 may illustrate the coverage area of first AP 105. Second AP 115 may provide wireless network access for some of the plurality of client devices (e.g., second client device 130 and fourth client device 140). Fourth client device 140 may be hidden from (i.e., out of range of) first AP 105. Third client device 135 may be hidden from (i.e., out of range of) second AP 115. Micro cell 120 may illustrate the coverage area of second AP 115. First AP 105 and second AP 115 may implement SR features that allow co-channel OBSSs to transmit over each other in certain scenarios instead of backing off, potentially increasing network capacity.

The elements described above of operating environment 100 (e.g., first AP 105, second AP 115, first client device 125, second client device 130, third client device 135, and fourth client device 140) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

With reference to operating environment 100, second AP 115 may transmit a frame to fourth client device 140. First AP 105 may detect this OBSS transmission to be at a receive strength less than −62 dBm, but greater than −82 dBm (e.g., −74 dBm). First AP 105 may perform an SR transmission by lowering the Tx power by an amount equal to the receive strength of the OBSS transmission above −82 dBm. For this example, the Tx power may be lowered by 8 dBm. A problem may be that this lowered Tx power may not be sufficient to support the normal Tx modulation rate. First AP 105 may perform a SR transmission without lowering the Tx power in this case and still may not cause any detrimental interference to the OBSS transmission because fourth client device 140 is a hidden node to first AP 105 and possibly to all client devices associated to first AP 105. If first AP 105 does lower the Tx power, it may also need to lower the Tx modulation rate.

In another example, second AP 115 may transmit a frame to second client device 130. First AP 105 may detect this OBSS transmission to be at a receive strength less than −62 dBm, but greater than −82 dBm (e.g., −74 dBm). First AP 105 may perform an SR transmission by lowering the Tx power by an amount equal to the receive strength of the OBSS transmission above −82 dBm. For this example, the Tx power is lowered by 8 dBm. However, a problem may be that the receive signal strength of the SR transmission at second client device 130 may be detrimentally high relative to that of the original OBSS transmission at second client device 130 from second AP 115. As an example, both first AP 105 and second AP 115 may transmit at 20 dBm. The path loss between first AP 105 and second AP 115 may be 94 dB for example. Second AP 115's transmissions are received with a signal strength of −74 dBm at first AP 105 and vice-versa. The path loss, for example, between second AP 115 and second client device 130 may be 50 dB and the path loss between first AP 105 and second client device 130 may also 50 dB. In this example, an OBSS transmission would be received by second client device 130 at a receive strength of −30 dBm and an SR transmission by first AP 105 would be received at a receive strength of −38 dBm (i.e., −38=20−8−50) making the SINR at second client device 130 to be just 8 dB (i.e., 8=−30−(−38)). Embodiments of the disclosure may minimize interference upon receivers of OBSS frames when SR transmissions are performed over them.

Based on the AP and client locations, embodiments of the disclosure may provide processes for reducing the negative impact of downlink OBSS PD based SR transmissions. The 802.11ax standard may require that Tx power for an SR transmission be lowered based on the RSSI of the OBSS transmission to prevent the SR transmission from interfering with the OBSS transmission. By knowing the location of the OBSS client, the Tx power of the SR transmission may be more optimally lowered and in some cases, the SR transmission may be performed at a higher Tx power than what the 802.11ax standard mandates.

Figure 2:
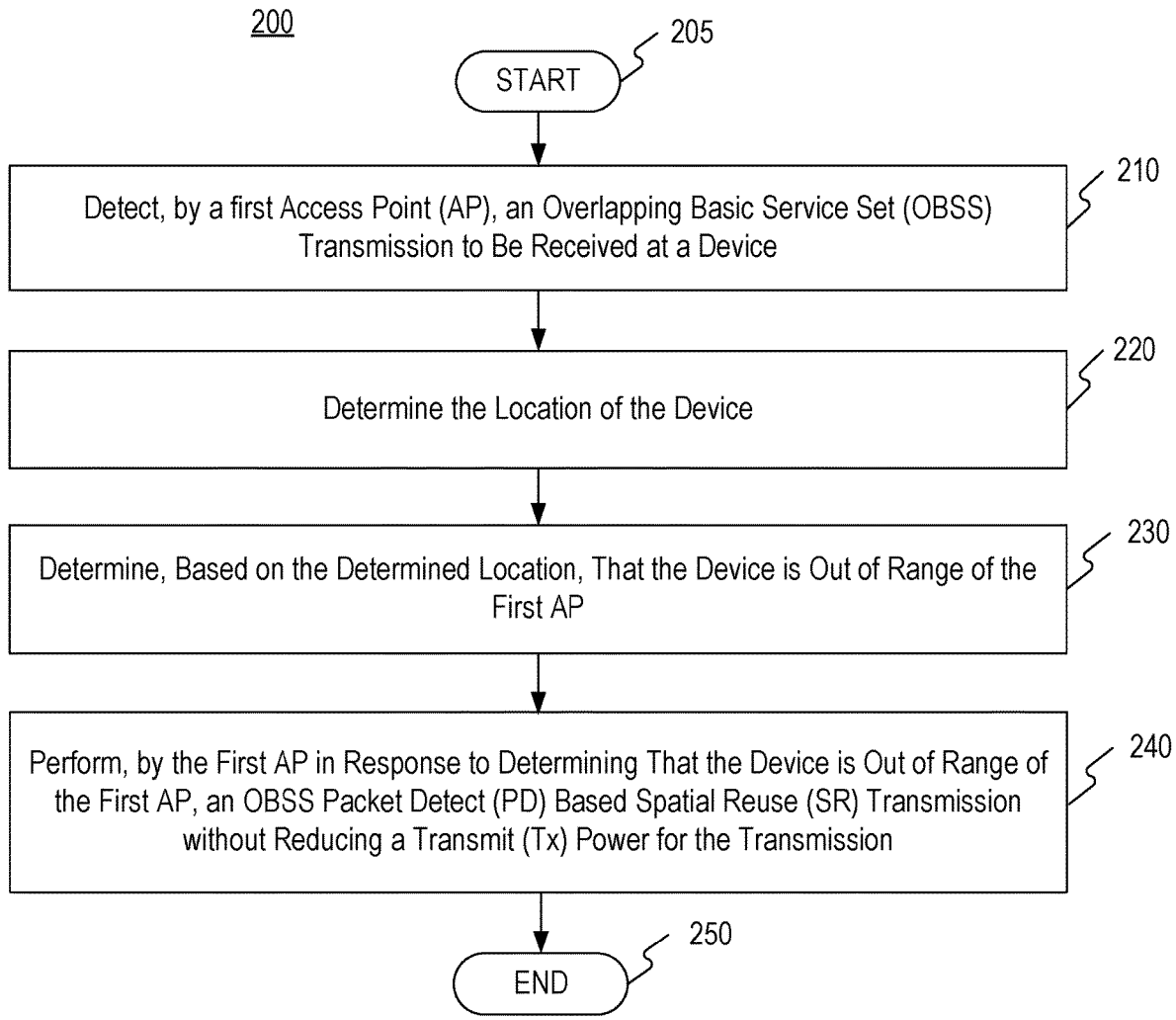
FIG. 2 is a flow chart of a method for providing location-aware spatial reuse.

FIG. 2 is a flow chart setting forth the general stages involved in a method 200 consistent with an embodiment of the disclosure for providing location-aware spatial reuse. For example, if the OBSS transmission is destined to a client or AP that is a hidden node to the AP, then the SR transmission may be performed at full Tx power. Method 200 may be implemented using first AP 105 as described in more detail above with respect to FIG. 1. Ways to implement the stages of method 200 will be described in greater detail below.

Method 200 may begin at starting block 205 and proceed to stage 210 where first AP 105 may detect an OBSS transmission to be received at a device (e.g., fourth client device 140). For example, second AP 115 may transmit a frame (e.g., an OBSS transmission) to fourth client device 140. First AP 105 may detect this OBSS transmission.

From stage 210, where first AP 105 detects the OBSS transmission to be received at the device, method 200 may advance to stage 220 where first AP 105 may determine the location of the device (e.g., fourth client device 140). For example, the location of fourth client device 140 may be determined using a BSS "color" based location process. With this process, each of the plurality of APs may be assigned a unique BSS color such that no two adjacent APs have the same BSS color. Using BSS color collision report frame information (e.g., described in the IEEE 802.11ax standard D4.0 section 26.17.3.2.2), which contains all BSS colors seen by a client device, each AP may determine which neighboring BSSs are not hidden nodes to each client. The APs can frequently and periodically all share this information and then deduce which BSSs are hidden nodes to each client. When an AP detects a OBSS transmission to a client or AP in a BSS that is a hidden node, the AP can safely perform an SR transmission without backing off the Tx power.

Other processes may be used to determine the location of devices in operating environment 100. For example, the IEEE 802.11 Fine Timing Measurement standard or the IEEE 802.11az Next Generation Positioning standard may be used to determine the relative position of each client device with respect to each AP. The location of each AP may be determined from deployment data for example. Furthermore, a process for determining the location of a device may be based on a triangulation of estimated distances by three of more APs in the vicinity of the device when the device performs a transmission for example. The distances may be estimated based on the received signal strengths of a transmission by the device and applying path loss models.

Once first AP 105 determines the location of the device (e.g., fourth client device 140) in stage 220, method 200 may continue to stage 230 where first AP 105 may determine, based on the determined location, that the device is out of range of (i.e., hidden from) first AP 105. For example, with reference to FIG. 1, third client device 135 may not hear the BSS color of second AP 115's BSS and fourth client device 140 may not hear the BSS color of first AP 105's BSS. First client device 125 and second client device 130 may hear the BSS colors of first AP 105's and second AP 115's BSSs. The BSS color information reports for each client are shown below in Table 1. The color of first AP 105's BBS may be blue and the color of second AP 115's BBS may be orange. The BSS colors may comprise unique binary codes and the names of the colors (e.g., blue and orange) used here may comprise examples that may map to the unique binary codes.

TABLE 1

| Client Device | BSS Colors Seen |
|---|---|
| First client device 125 | Blue, Orange |
| Second client device 130 | Blue, Orange |
| Third client device 135 | Blue |
| Fourth client device 140 | Orange |

The client device share the BSS color information with their respective APs and the APs then share the BSS color reports of their associated client devices to determine which of the client devices are their hidden nodes. First AP 105 may now determine that fourth client device 140 may be a hidden node, but second client device 130 may not be. Similarly, second AP 115 may determine that third client device 135 may be a hidden node, but first client device 125 may not be.

After first AP 105 determines, based on the determined location, that the device (e.g., fourth client device 140) is out of range of (i.e., hidden from) first AP 105 in stage 230, method 200 may proceed to stage 240 where first AP 105 may perform, in response to determining that the device (e.g., fourth client device 140) is out of range of the first AP, an OBSS PD based SR transmission without reducing a Tx power for the transmission. For example, when first AP 105 detects an OBSS transmission to fourth client device 140, which is a node that first AP 105 knows is hidden from first AP 105, first AP 105 may safely perform an SR transmission without backing off the Tx power as would otherwise be required by the 802.11ax standard for SR. This is because any transmission from first AP 105 may not cause interference at fourth client device 140 because fourth client device 140 may be hidden from first AP 105. The Tx power for the transmission may comprise a highest power first AP 105 is capable of transmitting. Once first AP 105 performs the OBSS PD based SR transmission without reducing the Tx power for the transmission in stage 240, method 200 may then end at stage 250.

Figure 3:
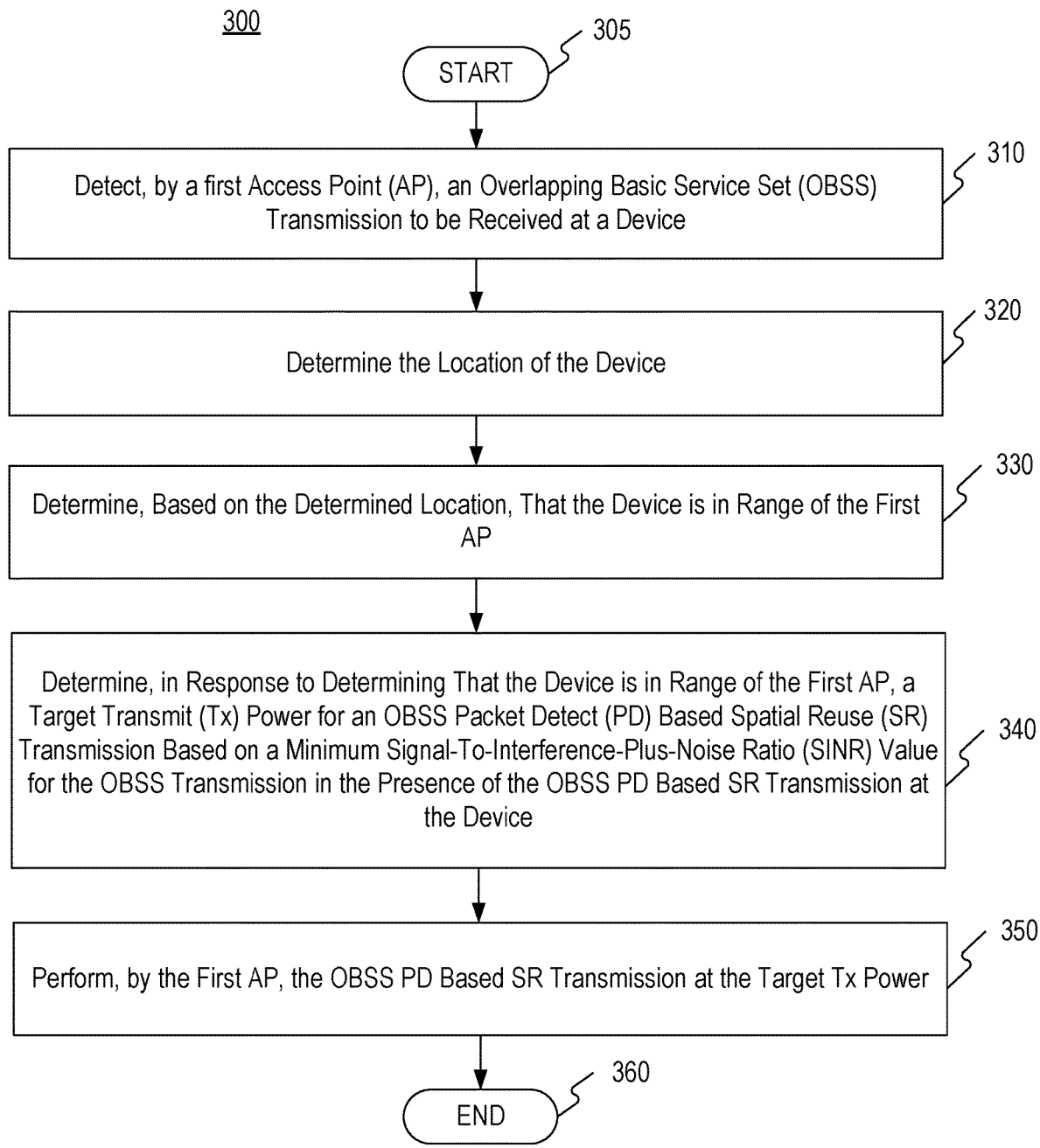
FIG. 3 is a flow chart of a method for providing location-aware spatial reuse.

FIG. 3 is a flow chart setting forth the general stages involved in a method 300 consistent with an embodiment of the disclosure for providing location-aware spatial reuse. For OBSS transmissions destined to clients or APs that are not hidden nodes to the AP, the SR transmissions may follow the rules for backing off Tx power as described by the IEEE 802.11ax standard specification. Additionally, consistent with embodiments of the disclosure, if the location of the OBSS client or OBSS AP relative to the AP suggests that the path loss for the SR transmission by the AP is not sufficiently large and may cause the SR transmission by the AP to interfere with the original OBSS transmission, the AP may further reduce the Tx power for the SR transmission or may even abort SR transmission. If the SR transmission is scheduled, consistent with embodiments of the disclosure, the rate selection algorithm may choose an optimal modulation rate to provide sufficient link margin for the SR transmission to be successfully received at the lower Tx power.

Method 300 may be implemented using first AP 105 as described in more detail above with respect to FIG. 1. Ways to implement the stages of method 300 will be described in greater detail below.

Method 300 may begin at starting block 305 and proceed to stage 310 where first AP 105 may detect an Overlapping Basic Service Set (OBSS) transmission to be received at a device (e.g., second client device 130). For example, second AP 115 may transmit a frame (e.g., an OBSS transmission) to second client device 130. First AP 105 may detect this OBSS transmission.

From stage 310, where first AP 105 detects the OBSS transmission to be received at the device (e.g., second client device 130), method 300 may advance to stage 320 where first AP 105 may determine the location of the device. For example, the IEEE 802.11 Fine Timing Measurement standard or the IEEE 802.11az Next Generation Positioning standard may be used to determine the relative position of each client device with respect to each AP. The location of each AP may be determined from deployment data for example. Furthermore, a process for determining the location of a device may be based on a triangulation of estimated distances by three or more APs in the vicinity of the device when the device performs a transmission for example. The distances may be estimated based on the application of path loss models to the received signal strengths of a transmission by the device.

Once first AP 105 determines the location of the device in stage 320, method 300 may continue to stage 330 where first AP 105 may determine, based on the determined location, that the device (e.g., second client device 130) is in range of first AP 105. For example, knowing the location of second client device 130 and knowing its own location, first AP 105 may determine that second client device 130 is within first micro cell 110 and thus in range of first AP 105.

After first AP 105 determines, based on the determined location, that the device is in range of first AP 105 in stage 330, method 300 may proceed to stage 340 where first AP 105 may determine, in response to determining that the device is in range of the first AP, a target Tx power for an OBSS PD based SR transmission based on a minimum Signal-to-Interference-Plus-Noise Ratio (SINR) value for the OBSS transmission in the presence of the OBSS PD based SR transmission at the device (e.g., second client device 130). For example, location information may be used to estimate path losses and a SINR of OBSS transmissions in the presence of SR transmissions. In other words, with the locations of each AP and client device known, path loss models may be used to estimate the path loss between each AP and OBSS client device and each AP and OBSS AP.

First AP 105 may detect an OBSS transmission from second AP 115 and may determine the Tx power used by the OBSS AP (i.e., second AP 115) to transmit to the OBSS client (e.g., second client device 130) (OBSS Tx Power=RSSI−Path loss to OBSS AP). Hence first AP 105 may determine the receiver strength of the OBSS transmission at the OBSS client (e.g., second client device 130) (OBSS Tx Power-Path loss between OBSS AP and OBSS client). First AP 105 may then determine the receive strength of an SR transmission (e.g., from first AP 105) at the OBSS client (SR Tx Power-Path loss between SR AP and OBSS client) and consequently estimate the SINR of the OBSS transmission in the presence of SR transmission.

With the estimation of the above parameters, the SR AP (e.g., first AP 105) may determine the target Tx power for the SR transmit opportunity. A minimum SINR required for OBSS transmissions in the presence of SR transmissions may be preconfigured, which may optionally have a different minimum SINR for each Modulation and Coding Scheme (MCS) of the received OBSS packet. This minimum SINR may determine the target Tx power for the SR transmission. If the target Tx power for the SR transmission is unusable for any of the client devices associated to the SR AP, then the SR transmission may be aborted. If the target Tx power for the SR transmission is usable for a subset of associated client devices with traffic queued at the SR AP, the SR transmission may be scheduled at the lower target Tx power. Additionally, the SR AP may determine the best MCS for the SR transmission at the lower target Tx power based on the path loss estimate to the SR client.

From stage 340, where first AP 105 determines, in response to determining that the device (e.g., second client device 130) is in range of first AP 105, a target Tx power for the OBSS PD based SR transmission based on the minimum SINR value for the OBSS transmission in the presence of the OBSS PD based SR transmission at the device, method 300 may advance to stage 350 where first AP 105 may perform the OBSS PD based SR transmission at the target Tx power. Once first AP 105 performs the OBSS PD based SR transmission at the target Tx power in stage 350, method 300 may then end at stage 360.

For APs (e.g., first AP 105) that are equipped with antenna array elements, consistent with embodiments of the disclosure, the SR transmission (e.g., from first AP 105) may be scheduled to a client device (e.g., third client device 135) that is in a different direction than the OBSS receiver client (e.g., second client device 130) and may be performed using a directional antenna pattern that causes low interference at the OBSS receiver client. The AP may be operating antennas in an omnidirectional mode. However, for SR packet transmissions alone, the AP may convert the omnidirectional antennas to become directional by introducing phase-shifts (or by engaging additional directional antenna elements) so that the SR packet can be transmitted to a client in a different direction (taking into account known AP client device locations and directional beam width) than the OBSS receiver at a higher Tx power without interfering with the OBSS packet sent to the OBSS receiver client from second client device 115 for example.

While embodiments of the disclosure described above have been directed toward scheduling downlink spatial reuse transmissions, the same may be applied for scheduling trigger-based uplink transmissions. With the same hidden node, location, and path loss information, an AP may schedule trigger-based uplink transmissions that may avoid interference upon OBSS packets while optimizing TX power and MCS. Knowledge of AP antenna patterns (directional or omnidirectional) and TX beamforming may also be taken into account to improve the precision of embodiments of the disclosure.

Figure 4:
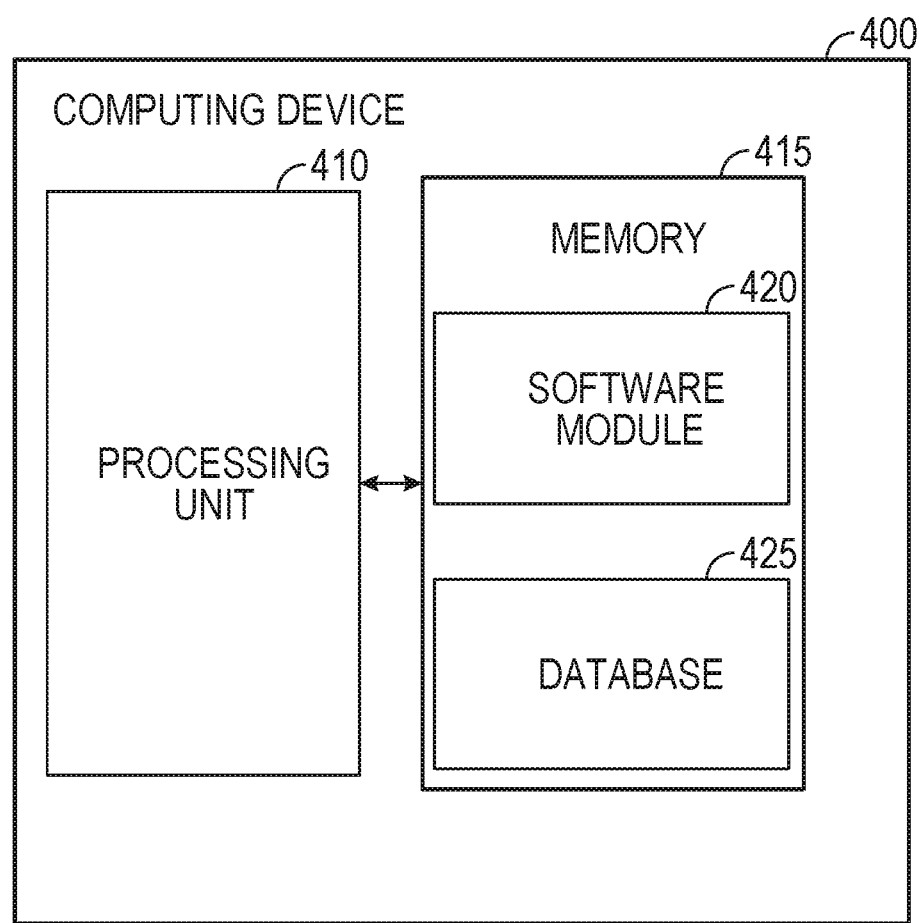
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing location-aware spatial reuse as described above with respect to FIG. 2 and FIG. 3. Computing device 400, for example, may provide an operating environment for first AP 105, second AP 115, first client device 125, second client device 130, third client device 135, or fourth client device 140. First AP 105, second AP 115, first client device 125, second client device 130, third client device 135, and fourth client device 140 may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   detecting, by a first Access Point (AP), an Overlapping Basic Service Set (OBSS) transmission to be received at a device from a second AP;
   determining, by the first AP in response to detecting the OBSS transmission to be received at the device from the second AP, a location of the device;
   determining, by the first AP based on the determined location, that the device is out of range of the first AP; and
   performing, by the first AP in response to determining that the device is out of range of the first AP, an OBSS Packet Detect (PD) based Spatial Reuse (SR) transmission without reducing a transmit (Tx) power for the transmission, wherein performing the OBSS PD based SR transmission without reducing the Tx power for the transmission comprises performing transmission by the first AP without reducing the Tx power over an overlapping channel with the second AP.

2. The method of claim 1, further comprising:
   receiving the OBSS transmission from the second AP; and
   wherein detecting the OBSS transmission comprises detecting the OBSS transmission in response to receiving the OBSS transmission from the second AP.

3. The method of claim 1, wherein determining the location of the device comprises determining the location of the device by the first AP based on Basic Service Set (BSS) color information visible to the device and sent by the device to the second AP that, in turn, shared it with the first AP.

4. The method of claim 1, wherein determining the location of the device comprises determining the location of the device by the first AP based on Basic Service Set (BSS) color information visible to the device and sent by the device to the first AP, wherein the device comprises a second AP.

5. The method of claim 1, wherein determining the location of the device comprises determining the location of the device using Institute of Electrical and Electronics Engineers (IEEE) 802.11 Fine Timing Measurement standard.

6. The method of claim 1, wherein determining the location of the device comprises determining the location of the device using IEEE 802.11az Next Generation Positioning standard.

7. The method of claim 1, wherein the Tx power for the OBSS PD based SR transmission comprises a highest power the first AP is capable of transmitting.

8. A method comprising:
   detecting, by a first Access Point (AP), an Overlapping Basic Service Set (OBSS) transmission to be received at a device from a second AP;
   determining, by the first AP in response to detecting the OBSS transmission to be received at the device from the second AP, a location of the device;
   determining, by the first AP based on the determined location, that the device is in range of the first AP;
   determining, by the first AP in response to determining that the device is in range of the first AP, a target transmit (Tx) power for an OBSS Packet Detect (PD) based Spatial Reuse (SR) transmission based on a minimum Signal-to-Interference-Plus-Noise Ratio (SINR) value for the OBSS transmission in a presence of the OBSS PD based SR transmission at the device; and
   performing, by the first AP, the OBSS PD based SR transmission at the target Tx power.

9. The method of claim 8, further comprising:
   receiving the OBSS transmission from the second AP; and
   wherein detecting the OBSS transmission comprises detecting the OBSS transmission in response to receiving the OBSS transmission from the second AP.

10. The method of claim 8, wherein determining the location of the device comprises determining the location of the device using Institute of Electrical and Electronics Engineers (IEEE) 802.11 Fine Timing Measurement standard.

11. The method of claim 8, wherein determining the location of the device comprises determining the location of the device using IEEE 802.11az Next Generation Positioning standard.

12. The method of claim 8, wherein determining the target Tx power comprises determining the target Tx power based on a path loss between the first AP and the device.

13. The method of claim 8, wherein determining the target Tx power comprises determining target Tx power based on a path loss between the second AP that sent the OBSS transmission and the device.

14. The method of claim 8, wherein determining the target Tx power comprises determining the target Tx power based on a location of the first AP.

15. The method of claim 8, wherein determining the target Tx power comprises determining the target Tx power based on a location of the second AP that sent the OBSS transmission.

16. The method of claim 8, wherein the minimum SINR value depends on a Modulation and Coding Scheme (MCS) used by the OBSS transmission.

17. The method of claim 8, further comprising determining, by the first AP, a best Modulation and Coding Scheme (MCS) for the OBSS PD based SR transmission at the target Tx power based on a path loss estimate to a second device.

18. A system comprising:
a memory storage; and
a processing unit disposed in a first Access Point (AP) and coupled to the memory storage, wherein the processing unit is operative to:
   detect an Overlapping Basic Service Set (OBSS) transmission to be received at a device from a second AP;
   determine, in response to detecting the OBSS transmission to be received at the device from the second AP, a location of the device;
   direct a pattern of at least one antenna away from the location of the device; and
   perform an OBSS Packet Detect (PD) based Spatial Reuse (SR) transmission from the at least one antenna without reducing a transmit (Tx) power for the transmission.

19. The system of claim 18, wherein the processing unit being operative to detect the OBSS transmission comprises the processing unit being operative to detect the OBSS transmission in response to the first AP receiving the OBSS transmission from the second AP.

20. The system of claim 18, wherein the processing unit being operative to determine the location of the device comprises the processing unit being operative to determine the location of the device using one of: Institute of Electrical and Electronics Engineers (IEEE) 802.11 Fine Timing Measurement standard and IEEE 802.11az Next Generation Positioning standard.

* * * * *